United States Patent
Lorenzen

(10) Patent No.: US 6,584,838 B2
(45) Date of Patent: Jul. 1, 2003

(54) ANGULAR POSITION SENSOR

(75) Inventor: David Lorenzen, Breckenridge, CO (US)

(73) Assignee: Sensor Solutions Corporation, Breckenridge, CO (US)

( * ) Notice: Subject to any disclaimer, the term of this patent is extended or adjusted under 35 U.S.C. 154(b) by 0 days.

(21) Appl. No.: 09/681,113

(22) Filed: Jan. 11, 2001

(65) Prior Publication Data

US 2002/0178810 A1 Dec. 5, 2002

(51) Int. Cl.⁷ .............................................. G01F 23/30
(52) U.S. Cl. ....................................... 73/314; 73/290 R
(58) Field of Search ............................ 73/634, 862.328, 73/514.31, 1.75, 314, 290 R; 324/146, 160, 174, 205, 207.11

(56) References Cited

U.S. PATENT DOCUMENTS

| | | |
|---|---|---|
| 3,112,464 A | 11/1963 | Ratajski et al. |
| 3,742,243 A | 6/1973 | Gamble |
| 3,777,273 A | 12/1973 | Baba et al. |
| 4,086,533 A | 4/1978 | Ricouard et al. |
| 4,125,821 A | 11/1978 | Masuda |
| 4,293,837 A | 10/1981 | Jaffe et al. |
| 4,392,375 A | 7/1983 | Eguchi et al. |
| 4,395,695 A | 7/1983 | Nakamura |
| 4,418,340 A | 11/1983 | Maeshiba |
| 4,425,557 A | 1/1984 | Nakamura |
| 4,570,118 A | 2/1986 | Tomczak et al. |
| 4,703,261 A | 10/1987 | Berchtold |
| 4,719,419 A | 1/1988 | Dawley |
| 4,987,400 A | 1/1991 | Fekete |
| 5,055,781 A | 10/1991 | Sakakibara et al. |
| 5,159,268 A | 10/1992 | Wu |
| 5,164,668 A | 11/1992 | Alfors |
| 5,191,284 A | 3/1993 | Moretti et al. |
| 5,265,032 A | 11/1993 | Patel |
| 5,270,645 A | 12/1993 | Wheeler et al. |
| 5,300,883 A | 4/1994 | Richeson |
| 5,305,639 A * | 4/1994 | Pontefract .................... 73/317 |
| 5,351,387 A | 10/1994 | Iwata et al. |
| 5,444,369 A | 8/1995 | Luetzow |
| 5,570,118 A | 10/1996 | Rezanka et al. |
| 5,670,876 A | 9/1997 | Dilger et al. |
| 5,712,561 A | 1/1998 | McCurley |
| 5,757,179 A | 5/1998 | McCurley et al. |

(List continued on next page.)

OTHER PUBLICATIONS

U.S. patent application Ser. No. 09/758,857, Ross, filed Jan. 11, 2001

*Primary Examiner*—Helen Kwok
*Assistant Examiner*—Rodney T. Frank
(74) *Attorney, Agent, or Firm*—Oppedahl & Larson LLP

(57) ABSTRACT

A liquid level sensor is provided for use with a container. The sensor protrudes through an opening in the container. The sensor includes a float linked by means of a linkage to a first magnet axially rotatable on a first axis. The first magnet has a magnetic moment with a nonzero component at a right angle to the axis. A divider separates the first magnet from a second magnet having a magnetization and axially rotatable on a second axis. The second magnet has a nonzero magnetic moment at a right angle to the second axis. The first and second magnets are juxtaposed in magnetic linkage so that the second magnet is urged to follow the first magnet in rotation. The divider plugs the opening in the container. A magnetic field sensor is positioned to sense axial magnetic field strength at a location offset from the second axis. Importantly, the magnetization of the second magnet gives rise to a sensed magnetic field at the sensor that is nonsinusoidal with respect to an angle of rotation of the second magnet on the second axis, or gives rise to north and south poles separated by more than a half-circle or axial rotation of the second magnet.

12 Claims, 17 Drawing Sheets

U.S. PATENT DOCUMENTS

| | | |
|---|---|---|
| 5,798,639 A | 8/1998 | McCurley et al. |
| 5,850,142 A | 12/1998 | Rountos et al. |
| 5,936,613 A | 8/1999 | Jaeger et al. |
| 5,955,881 A | 9/1999 | White et al. |
| 5,982,170 A * | 11/1999 | McCurley et al. ....... 324/207.2 |
| 6,018,241 A | 1/2000 | White et al. |
| 6,041,650 A | 3/2000 | Swindler et al. |
| 6,064,197 A | 5/2000 | Lochmann et al. |
| 6,089,086 A | 7/2000 | Swindler et al. |

* cited by examiner

ANGULAR POSITION SENSOR

BACKGROUND OF INVENTION

It is not easy to measure liquid levels, especially where the liquids are hazardous or flammable.

It is well known in the art to provide a float within a container, the float caused to rise and fall by the level of liquid in the container. The float is linked to a rotating first magnet that is within the container, or is at least on the liquid side (inside) of a divider that is joined to an opening in the container. The first magnet is magnetized so that a magnetic moment has a nonzero component at a right angle to the axis of rotation, and preferably its moment is entirely at a right angle to that axis. A second rotating magnet is on the outside of the divider, and is nearly coaxial with and magnetically coupled with the first magnet, likewise having a moment (or a component of the moment) perpendicular to the axis. The second magnet may actuate a pointer providing a human-readable indication of the liquid level. The second magnet is physically nearby to a magnetic flux sensor such as a Hall-effect sensor. The flux sensed in the sensor is indicative of the liquid level. The sensed flux signal is converted from analog to digital and is passed on to other equipment. Mechanisms suitable for use in such apparatus are described, for example, in U.S. Pat. Nos. 4,987,400, 6,041,650, and 6,089,086, incorporated herein by reference.

Unfortunately, this approach offers many drawbacks. One drawback is that with the conventional and commonly used magnetization and magnet shape, the sensed flux deviates substantially from linearity with respect to the actual liquid level. While such nonlinearity can be corrected in software (after the A/D conversion, for example), this results in variations in resolution across the range of measured physical values such as liquid level, and adds to computational cost.

Yet another drawback is that with such magnetization and magnet shape, it is impossible to disambiguate certain distinct liquid levels based solely on the sensed flux at a particular time; for disambiguation it is necessary to maintain state information such as historical information about recent sensed values. Such disambiguation requires frequent data collection and depends upon assumptions regarding how quickly the liquid level might change. The disambiguation problem may be avoided by limiting the permitted angular rotation of the magnets, for example by choosing the details of the float linkage, such as gear ratios. This has the drawback of limiting either the resolution of the sensing system or the dynamic range of the sensing system, or requiring a more expensive analog-to-digital convertor.

It is thus desirable to provide a system for measurement of liquid levels or other physical phenomena, which employs a float or other follower linked to a first magnet, and a second magnet linked to the first magnet, where the electrical output is nearly linear with the physical phenomenon being measured, and wherein the dynamic range is maximized and resolution uncompromised, all without expensive post-processing of data and without expensive high-resolution A/D convertors.

SUMMARY OF INVENTION

A liquid level sensor is provided for use with a container. The sensor protrudes through an opening in the container. The sensor includes a float linked by means of a linkage to a first magnet axially rotatable on a first axis. The first magnet has a magnetic moment with a nonzero component at a right angle to the axis. A divider separates the first magnet from a second magnet having a magnetization and axially rotatable on a second axis. The second magnet has a nonzero magnetic moment at a right angle to the second axis. The first and second magnets are juxtaposed in magnetic linkage so that the second magnet is urged to follow the first magnet in rotation. The divider plugs the opening in the container. A magnetic field sensor is positioned to sense axial magnetic field strength at a location offset from the second axis. Importantly, the magnetization of the second magnet gives rise to a sensed magnetic field at the sensor that is nonsinusoidal with respect to an angle of rotation of the second magnet on the second axis, or gives rise to north and south poles separated by more than a half-circle or axial rotation of the second magnet.

BRIEF DESCRIPTION OF DRAWINGS

The invention will be described with respect to a drawing in several figures, of which.

DETAILED DESCRIPTION

Figure 16:
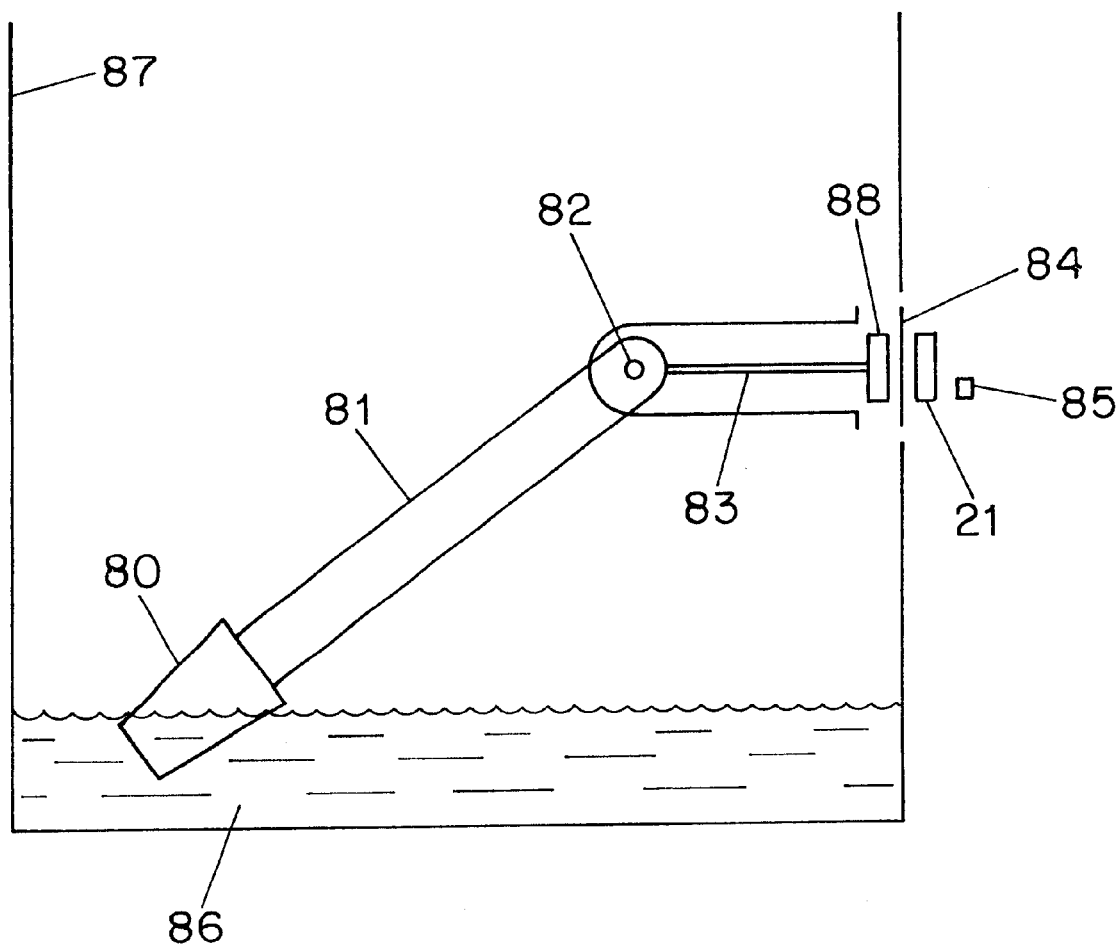
FIG. 16 shows a typical arrangement of float, float arm, pivot, linkage, and magnet juxtapositions, as found in the prior art and in the system according to the invention.

Turning first to FIG. 16, what is shown is a typical arrangement of float 80, float arm 81, pivot 82, linkage 83, and magnet juxtapositions, as found in the prior art and in the system according to the invention. The float 80 is caused to move upwards and downwards by the downward pull of gravity and by the upward force from the level of the liquid 86. Float 80 is selected to be less dense, and preferably much less dense, than the liquid 86. The upward force from the liquid is, of course, a function of the mass of the volume of liquid displaced by the portion of the float that is below the surface of the liquid. The float arm 81 and the rest of the internal parts are selected to have minimal volume so as to minimize the portion of the volume of the container 87 that is unavailable for liquid storage due to the presence of the sensing apparatus. The system is particularly helpful in cases where the liquid 86 is flammable, such as liquified natural gas, liquified propane, gasoline, jet fuel, or diesel fuel. Where the liquid has a relatively high vapor pressure (e.g. liquified natural gas or liquified propane) the container 87 is sealed (in part by divider or partition 84) and the gas phase and liquid phase of the stored fuel are in equilibrium determined by temperature and other factors. The divider or partition 84 is of course preferably nonmagnetic, so as to permit passage of magnetic flux; in a typical embodiment the divider is aluminum.

A mechanical linkage is provided which, in an exemplary embodiment, translates rotation of the arm 81 about the pivot 82 into rotation of a shaft 83. Shaft 83 causes magnet 88 to rotate. Despite the presence of the partition 84, the magnet 88 is magnetically linked with the magnet 21. Preferably the two magnets 88, 21 rotate coaxially. Sensor 85 senses the position of the magnet 21. The magnet 21 preferably has a radial pointer, omitted for clarity from FIG. 16, which is visible to a human user, also omitted for clarity from FIG. 16. The radial pointer can point to scale markings permitting the human user to read the liquid level in the container 87. The scale preferably shows percentage of capacity but may also read in units such as mass or weight or volume of liquid.

Figure 25:
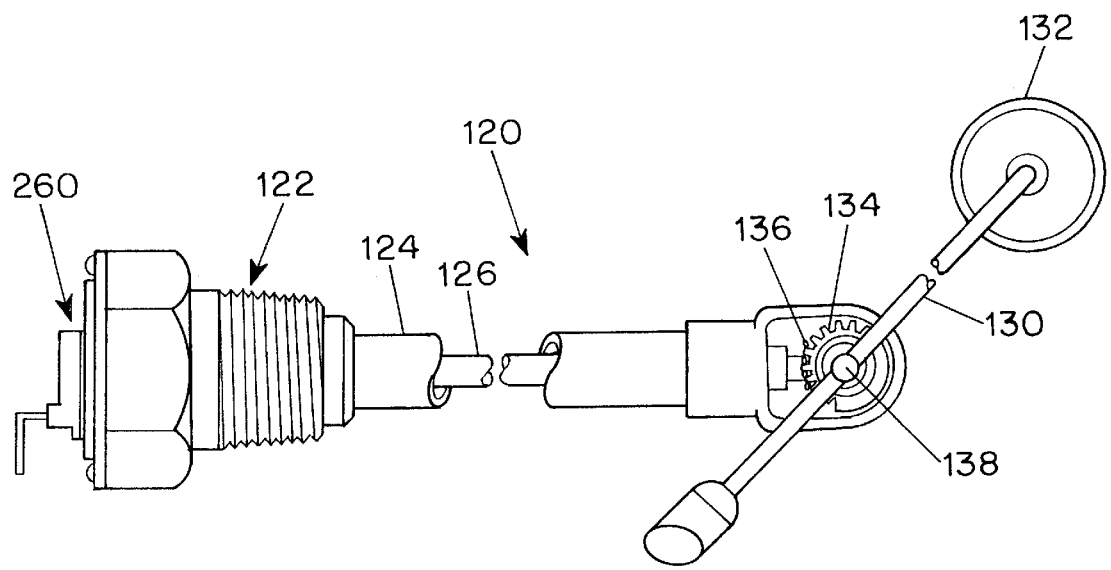
FIG. 25 shows a float arrangement in greater detail than FIG. 16.
Figure 26:
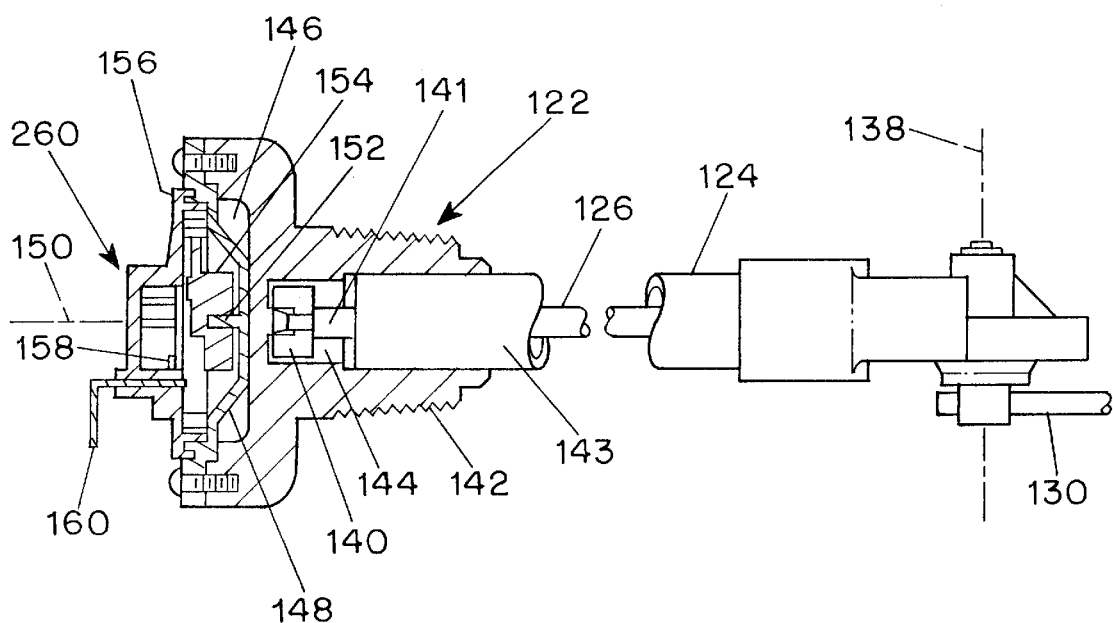
FIG. 26 shows the float arrangement of FIG. 26 in partial cutaway view.

Turning now to FIGS. 25 and 26, a typical float arrangement is shown in greater detail. In FIG. 25, liquid level gauge 120 is shown, part of which is gauge head 122. Support arm 124 extends away from head 122. A magnet driveshaft 126 communicates between gears 136, 134 and a first magnet, not shown in FIG. 25. Arm 130 rotates about pivot axis 138, carrying float 132. Dial assembly 160 provides angle measurement.

In FIG. 26, more detail can be seen of the dial assembly 160. Gauge head 122 is mounted to a tank (not shown) by threads 142. Shaft 126 has a first end 141 which is attached to magnet 140. Magnet 154 follows magnet 140. Magnetic sensor 158 detects the field from magnet 154. Passageway 144 contains magnet 140. Shaft 124 has an end 143 which is mounted to the head 122. The magnet 154 preferably rotates on a pin 152, which may be integrally formed with other plastic parts such as base 148 and preferably clear plastic cover 156. Electrical leads 160 extend from sensor 158. Base 148 fits into receptacle 146.

It must be appreciated that while FIGS. 16, 25, and 26 show preferred mechanical arrangements, these particular arrangements are merely considered preferable but are not required to obtain the benefits of the invention.

Figure 1:
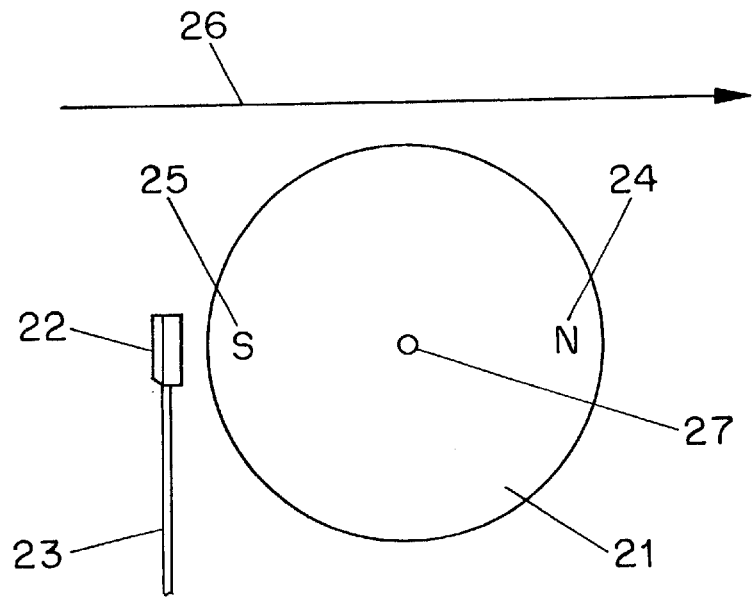
FIG. 1 shows a prior art sensing system employing a radially magnetized magnet and a radial sensor.

FIG. 1 shows a prior art sensing system employing a radially magnetized magnet 21 and a radial sensor 22. In such a system the sensor 22 is positioned radially from the magnet 21. The magnet 21 has a magnetization shown symbolically by arrow 26, which magnetization is radial and not axial. Those skilled in the art will appreciate that the magnetization might merely have a component in the plane parallel to the axis 27 (coming out of the page) to bring about a measurable signal at the sensor 22, though it is preferable that the magnetization be wholly within the plane parallel to the axis 27. This magnetization is stylized by north pole 24 and south pole 25. Electrical conductors 23 provide ground, power, and sensed signal connections in a preferred embodiment using a three-terminal Hall-effect sensor.

Figure 2:
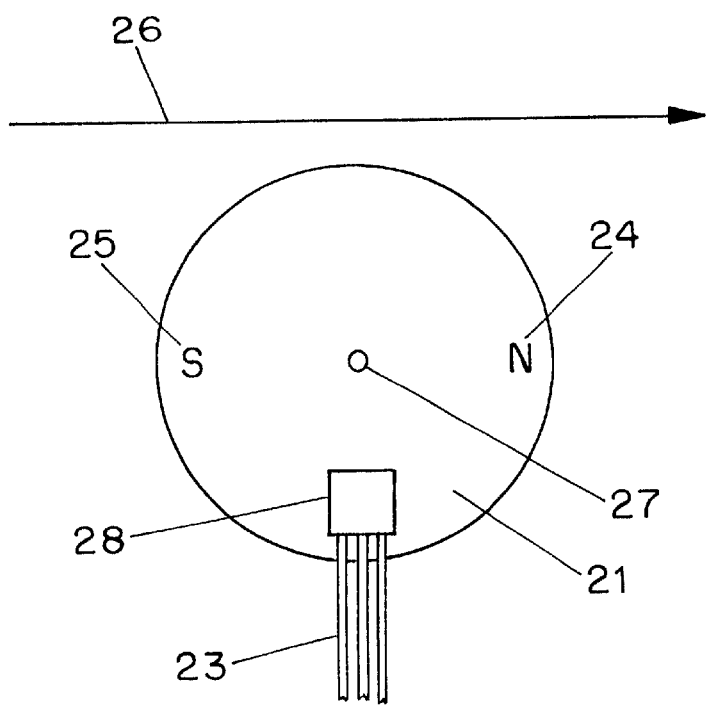
FIG. 2 shows a prior art sensing system employing a radially magnetized magnet and an axial sensor.

FIG. 2 shows a prior art sensing system employing a radially magnetized magnet 21 and an axial sensor 28. In such a system the sensor 28 is positioned axially from the magnet 21, and its position is not in the axis 27 but is radially offset from the axis 27. It is desirable that the sensor be radially offset as far as possible so as to pick up the strongest magnetic signals and thus to have the best possible signal-to-noise ratio.

Figure 3A:
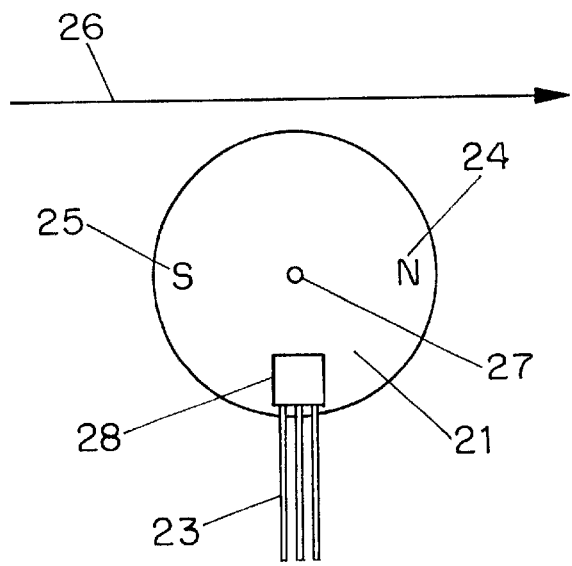
FIGS. 3a and 3b show axial and radial views, respectively, of a sensing system such as that of FIG. 2.
Figure 3B:
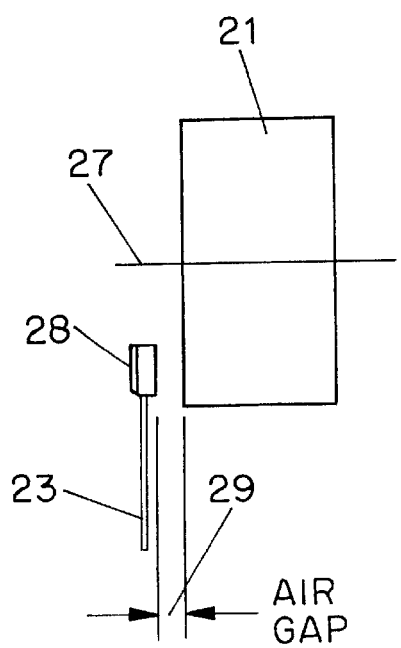

FIGS. 3a and 3b show axial and radial views, respectively, of a prior art sensing system such as that of FIG. 2. FIG. 3a corresponds closely with FIG. 2. FIG. 3b shows an air gap 29 which exists because of the nonzero distance between the sensor 28 and the surface of the magnet 21. The distance is desirably nonzero because it is harmful to have mechanical interference (e.g. friction) which might keep the magnet 21 from freely rotating to follow the magnet 88 (FIG. 16).

Figure 6:
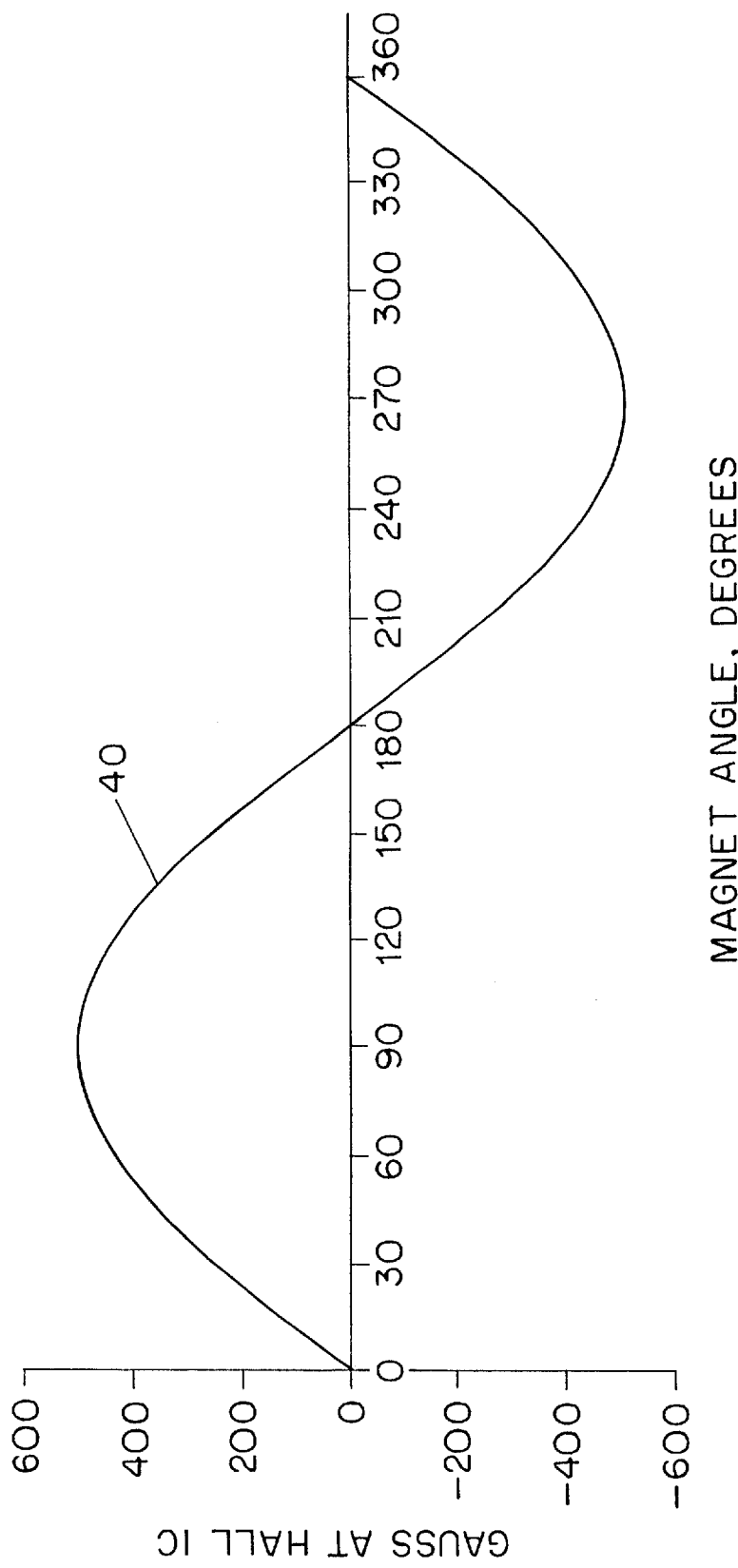
FIG. 6 shows a plot of magnetic field strength (e.g. gauss) as a function of magnet angle for a round magnet radially magnetized.
Figure 7:
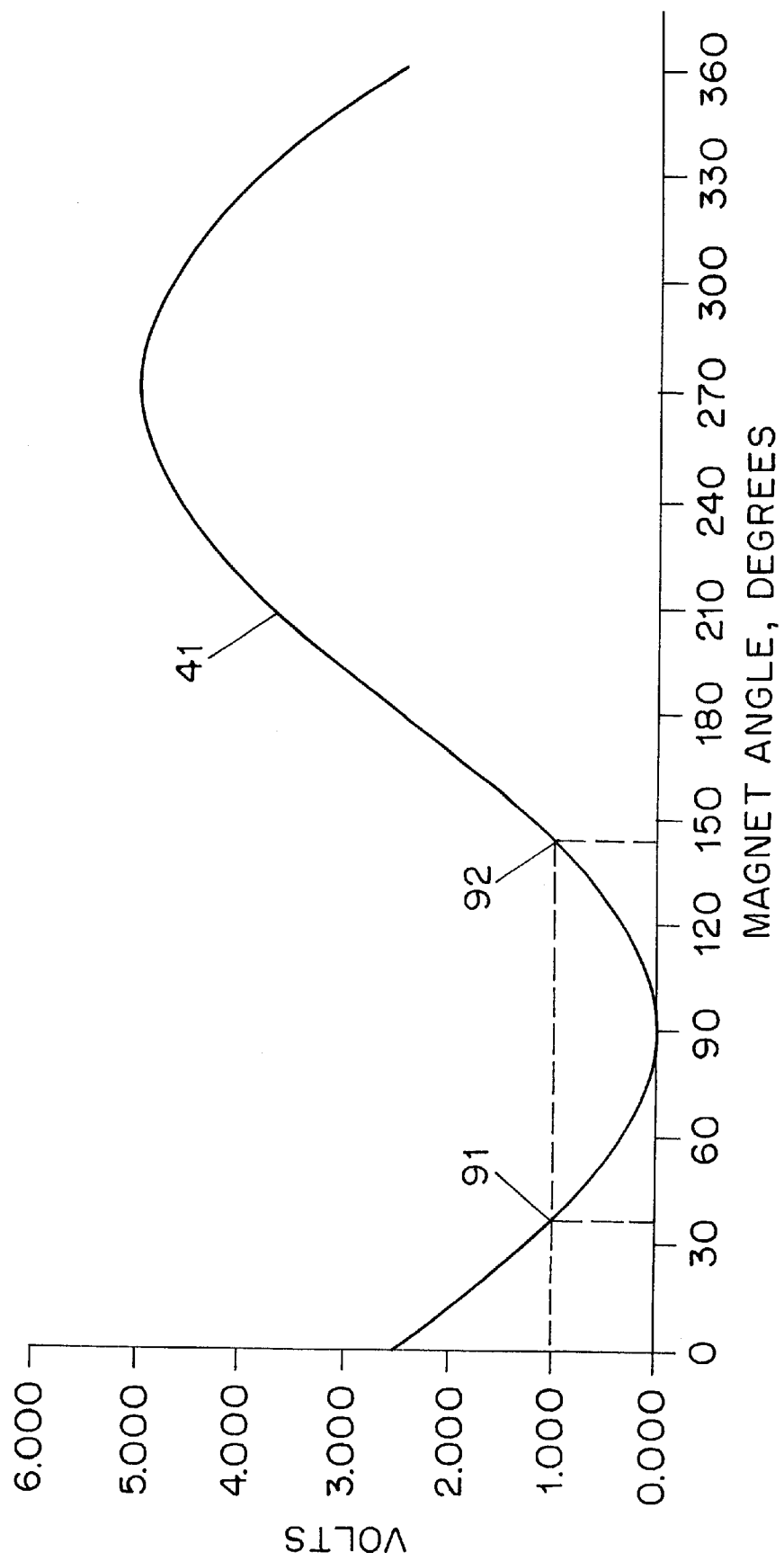
FIG. 7 shows a plot of Hall-effect sensed voltage from an axially positioned sensor relative to a radially magnetized magnet, assuming a voltage offset so that all electrical outputs are positive.

Turning now to FIG. 6, what is shown is a plot of magnetic field strength (e.g. gauss) as a function of magnet angle for a round magnet 21 (FIG. 3a) radially magnetized. The curve is, as expected from theory, essentially sinusoidal. The voltage output from the sensor 28 (FIG. 3a) is portrayed in FIG. 7, which shows a plot of Hall-effect sensed voltage from the axially positioned sensor 28 relative to the radially magnetized magnet 21. In this plot, it is assumed that a voltage offset is applied to the sensed voltage signal so that all electrical outputs are positive. With such an offset, the voltage in this case swings between zero and 5 volts, about a center value of 2.5 volts. The correspondence between FIGS. 6 and 7 is a consequence not only of this voltage offset but also of a gain assumed to be five millivolts per Gauss. As expected from theory, this curve is also sinusoidal.

The curve of FIG. 7 illustrates a classic "disambiguation" problem. Suppose the sensed voltage is 1.0 volt. Such a voltage could, on the assumptions underlying FIG. 7, result from a magnet angle of about 35 degrees or about 145 degrees. The precise angles are a function of gains and offsets and system geometries. With different gains and angles and geometries the particular angles corresponding to 1.0 volt might be different, but in any event there would be an ambiguity—is the sensor at one angle or at a different angle? There are several ways of dealing with (or avoiding) this ambiguity. One choice is to impose mechanical constraints so that the magnet angle never gets below 90 degrees or above 270 degrees. In fact to accommodate various error ranges, the constraint must impose a margin, so that the angle is never permitted to get below 90+x or above 270−x, where x is some positive value determined by experimentally determined error ranges. Returning to FIG. 16, this may require careful selection of the gear ratio between the shaft 83 and the arm 81. If the magnet 21 carries a human-readable pointer, the pointer is constrained to a range of something less than 180 degrees, making the gauge harder to read because the full-to-empty markings must fit into less than 180 degrees. Such angle restriction also limits the accuracy of the electrical measurements because even a small angle error (in absolute terms) gets magnified into a change of some number of bits after the A/D conversion.

A second way of dealing with this ambiguity is to sample the angle sufficiently frequently that one can be confident of the recent angle position as well as the recent rate of change of the angle (angular velocity). This can permit determining whether the magnet is at 35 degrees or 145 degrees from detailed knowledge of the previous position and velocity. This approach offers many drawbacks, of course. The system must maintain internal states such as historical position and velocity data. In addition, it must provide and allocate computational bandwidth for the necessary frequent sampling of the sensor data. Finally, there is the problem that if power is lost, the float may move during the outage and upon restoration of power it may be impossible to resolve initial ambiguity in the magnet angle.

Yet another problem evident from the curve of FIG. 7 is the nonlinearity problem. Even if the magnet angle is not permitted to stray beyond 90+x or 270−x, within that range the relationship between voltage and angle is not linear. Depending on the linkage between the float (FIG. 16) and the magnet 88 (FIG. 16), further nonlinearities may be introduced in the relationship between liquid level and voltage. While such nonlinearities may be corrected later in software, this may add to the hardware cost (by requiring more computational power) and will lead to non-constant resolution in differing parts of the measurement range since differing computational gains must be applied in differing parts of the range for the correction.

Figure 9:
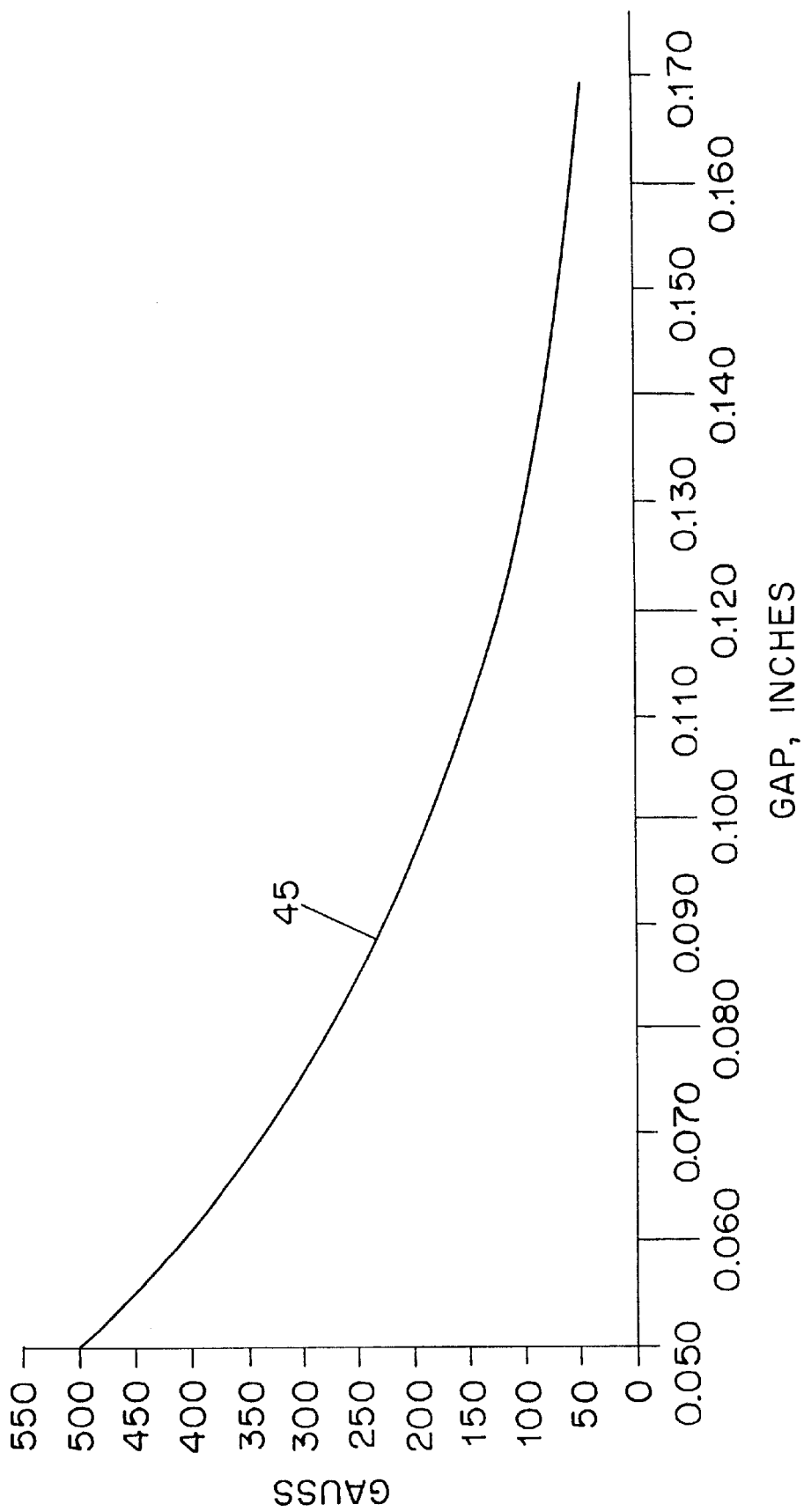
FIG. 9 shows a plot of magnetic field strength (e.g. gauss) as a function of air gap between an axial sensor and a magnet radially magnetized.

FIG. 9 shows an experimentally measured plot of magnetic field strength (e.g. gauss) as a function of air gap between an axial sensor and a magnet radially magnetized. Referring to FIG. 3b, increasing the air gap 29 decreases the detected magnetic field strength.

Figure 10:
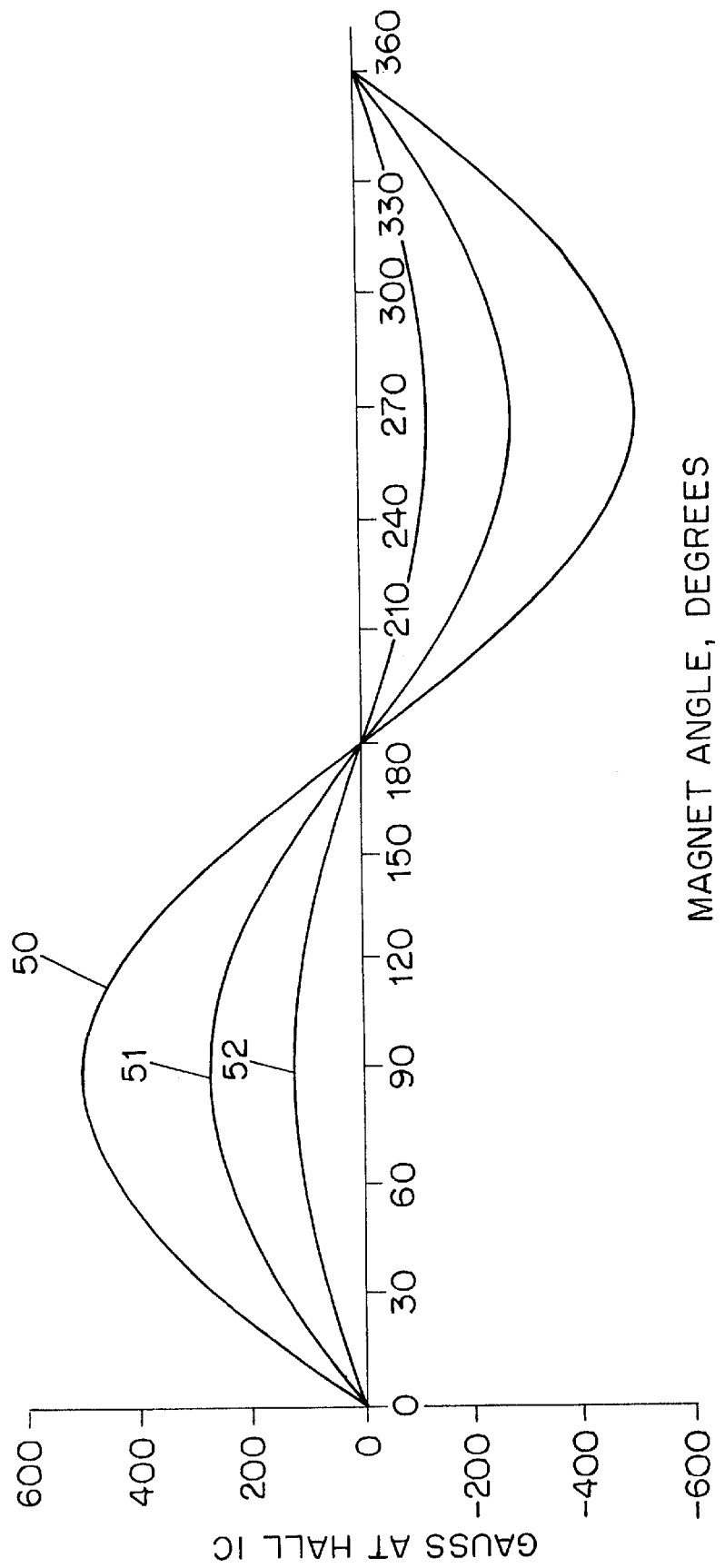
FIG. 10 shows a plot of expected magnetic field strength (e.g. gauss) using an axial sensor and a magnet radially magnetized, as a function of magnet angle, for each of three different choices of air gap.

FIG. 10 shows a plot of expected magnetic field strength (e.g. gauss) using an axial sensor and a magnet radially magnetized. The field strength is shown as a function of magnet angle, for each of three different choices of air gap. Curve 50 shows the measured field strength with a close (small) air gap, curve 51 shows the result with an increased air gap, and curve 52 shows the result with an even larger air gap.

For one skilled in the art, motivated to attempt to solve the problems discussed here, the dependence of sensed flux on the size of the air gap might prompt any of several approaches. For example, it might be considered to attempt to use an axial cam arrangement to physically move the rotating magnet closer to and further from the sensor as a function of rotation angle, or to use an axial cam arrangement to physically move the sensor closer to or further from the magnet as a function of rotation angle. Such approaches, however, offer several drawbacks. One drawback is that the cam arrangement likely introduces friction which can lead to lags in the response of the magnet 21 to small rotations of the magnet 88. Yet another is an increase in parts count and thus assembly time and cost, as well as a likely decrease in reliability.

Figure 4:
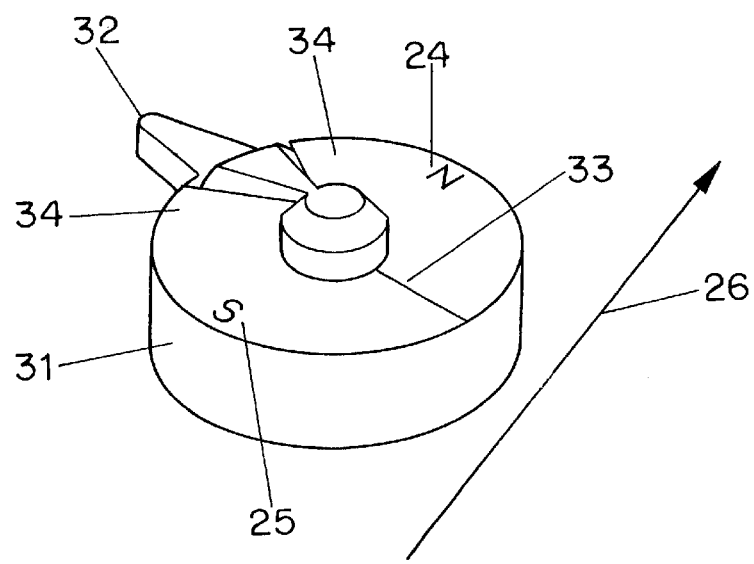
FIG. 4 shows a shaped top magnet according to the invention.

Insight may be drawn from FIGS. 9 and 10, to devise a magnet that has a shaped top. Resulting from such insight, FIG. 4 shows a shaped-top magnet 31 according to the invention. The magnet 31 offers a low point 33, roughly midway between the north and south poles 24, 25. The magnet 31 offers high points 34 roughly opposite from the low point 33. The magnet 31 also preferably has a pointer 32 providing a human-readable indication of the magnet angle. Optionally the shaped-top magnet may locate the north and south poles at an angular relationship that is not 180 degrees apart. For example the north and south poles might be up to 300 degrees apart (or, completing the circle, 60 degrees apart).

Figure 8:
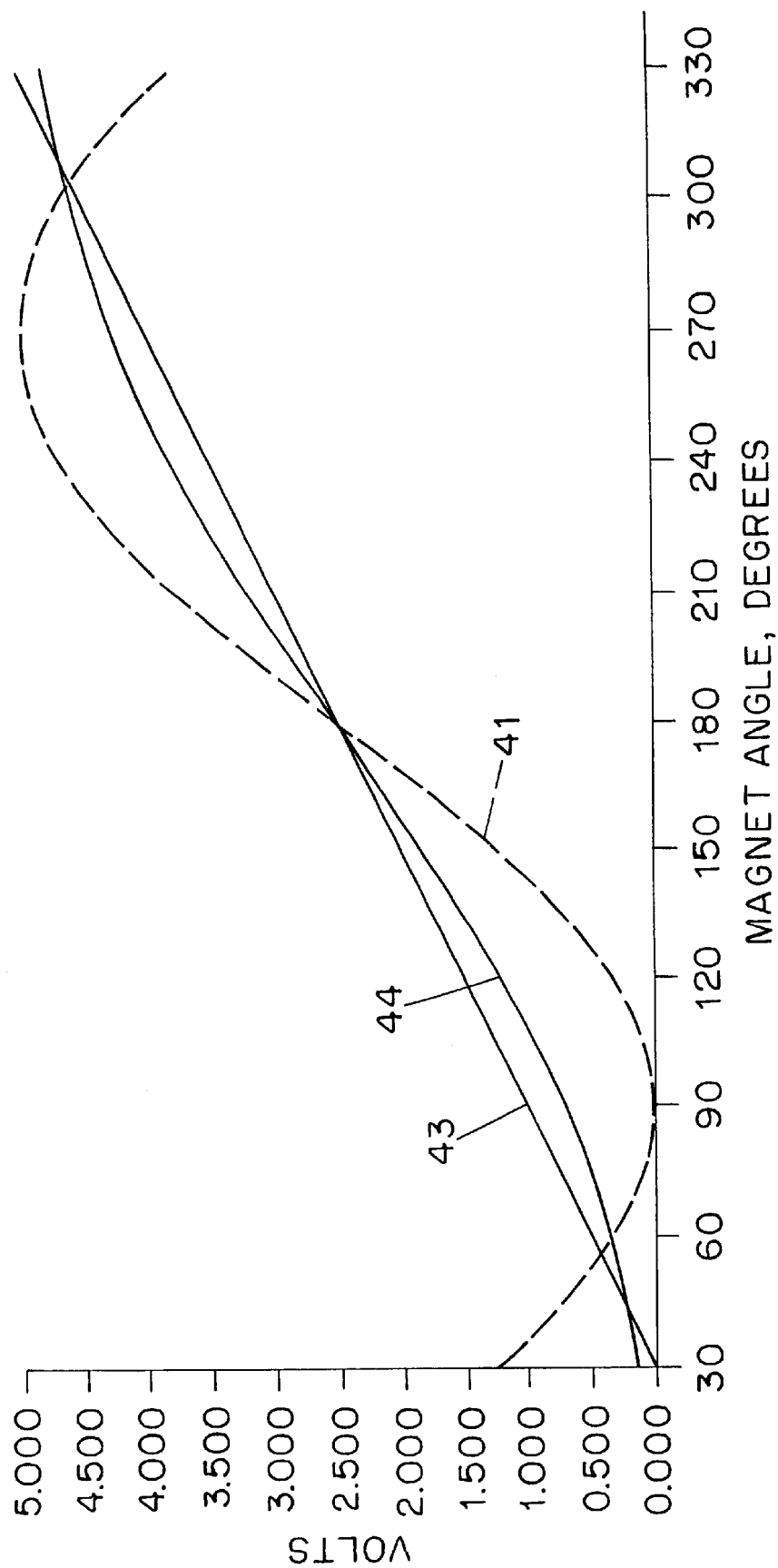
FIG. 8 shows a plot of Hall-effect sensed voltage from an axially positioned sensor relative to a rotating magnet, assuming a symmetric magnetization, or assuming a magnetization selected to give rise to a linear sensed voltage.

FIG. 8 shows a plot of Hall-effect sensed voltage from an axially positioned sensor relative to a rotating magnet, assuming a symmetric magnetization and assuming a flat top, or assuming a magnetization and top shape selected to give rise to a linear sensed voltage. The axes of FIG. 8 carry the same units as the axes of FIG. 7. The vertical scale is Hall-effect sensed voltage, taking into account the same offset discussed above in connection with FIG. 7, so that the range of output voltages is always positive with a center of travel at about 2.5 volts. Dotted line 41 shows the expected sinusoidal relationship between angle and measured voltage, just as in FIG. 7, on the assumption that the magnet has a flat (not shaped) top and has north and south poles 180 degrees apart.

With appropriate placement of the north and south poles, and with appropriate shaping of the top of the magnet, very desirable results may be obtained. Curve 43 (actually a straight line) offers a relationship between measured voltage and magnet angle that fulfills two important and previously unattained conditions—the relationship between voltage and angle are linear, and the physically measurable range is from 30 degrees to 330 degrees. This range, covering 300 degrees of rotation without any ambiguities as would be found with the curve of line 41, is much better than the somewhat less than 180 degrees available with the curve of line 41.

44 is intentionally nonlinear when compared with line 43. It must be recalled that the actual design goal is not linearity between magnet angle and voltage, but linearity between liquid level and voltage. The float linkage (for example that of FIG. 16) is itself somewhat nonlinear in the relationship between liquid level and magnet angle. Appropriate choices of magnet top shape (FIG. 4) can bring about intentional nonlinearity between magnet angle and voltage that bring about an overall linear relationship between liquid level and voltage.

Those skilled in the art will appreciate that there may be other sources of nonlinearity in the relationship between liquid level and magnet angle. The container 87 might have a non-constant cross section as a function of the liquid level. This could happen if, for example, the container were spherical instead of cylindrical. Even if the container 87 were chiefly cylindrical, it might have a hemispherical bottom (as in a small hand-carried LP tank) or might be a lateral cylinder with hemispherical ends (as in a residential heating fuel LP tank). In any of these cases, the magnet top is advantageously shaped to give rise to overall linearity between the amount of liquid present and the measured voltage.

Those skilled in the art will readily appreciate that the benefits of the invention do not depend on a particular mechanical linkage such as that shown in FIG. 16. Indeed those skilled in the art will have no difficulty devising other mechanical linkages and float arrangements that likewise benefit from the invention. For example, the shaft 83 could be vertical instead of horizontal, with the magnet 88 rotating at the top of the shaft in a horizontal plane. The shaft 83 could then be threaded with a partial thread, with the float freely sliding up and down the shaft, causing the shaft to rotate to an angle determined by the height of the float. Appropriate selection of magnet top shape can give overall linearity for other mechanical linkages and float arrangements.

Still another possibility is that the physical phenomenon being sensed is not communicated with a shaft but is instead communicated by linkage with a crank arm.

Figure 5:
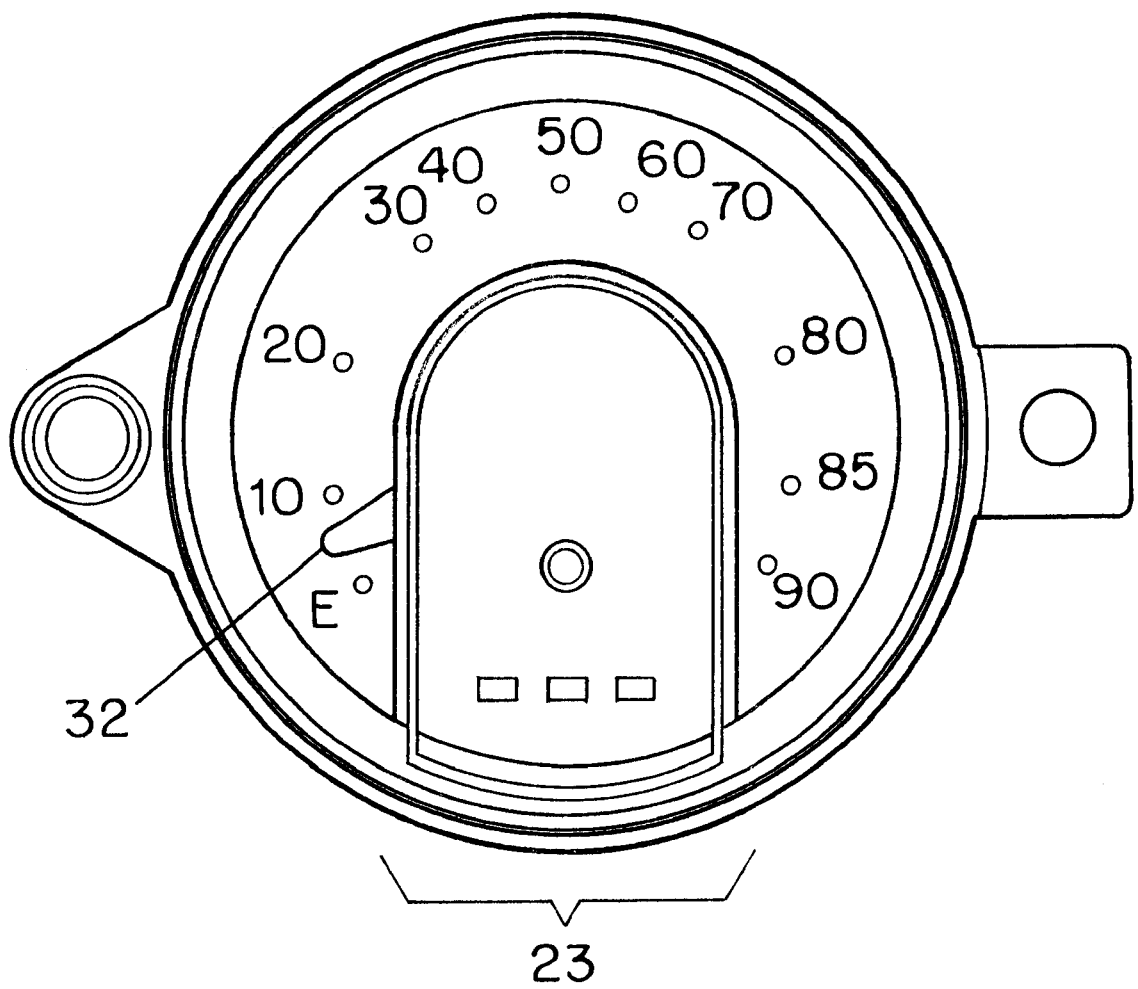
FIG. 5 shows a gauge according to the invention employing an intentionally nonlinear dial deflection.

FIG. 5 shows a gauge according to the invention employing an intentionally nonlinear dial deflection. Pointer 32 is visible, and the markings from E (empty) to full span well over 180 degrees. A clear cover protects the magnet 31 and permits a user to see the pointer. Connection points 23 provide connections to the Hall-effect sensor, not visible in FIG. 5.

Figure 11:
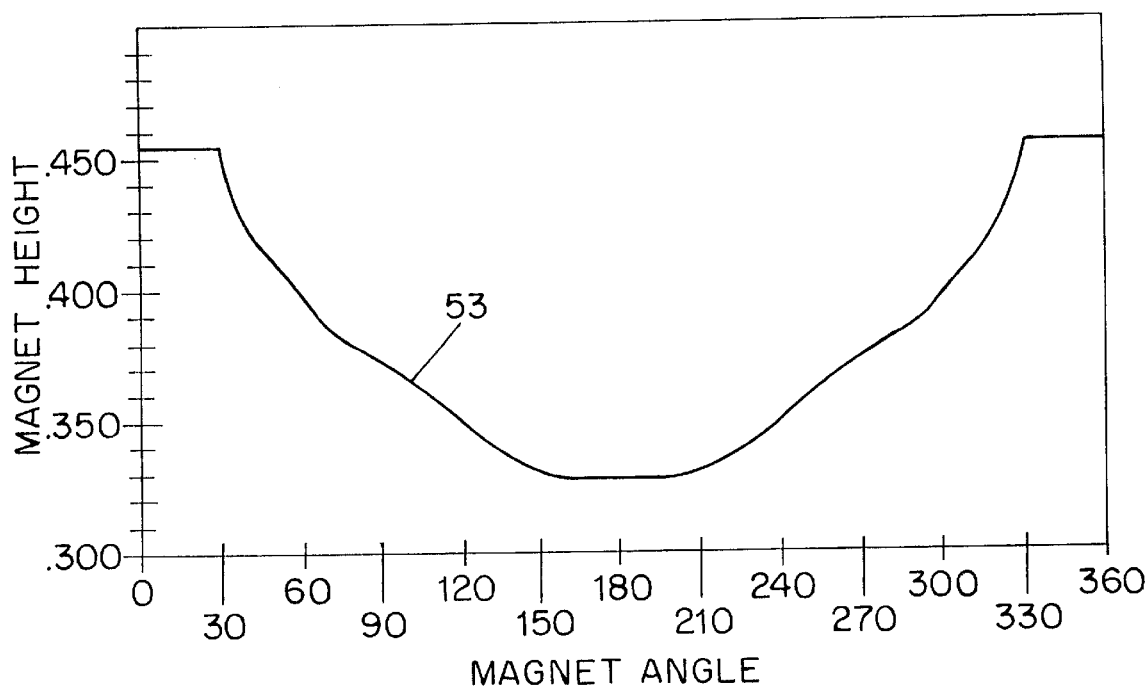
FIG. 11 shows an experimentally determined plot of magnet height at various magnet angles, according to the invention, giving rise to a linear or nearly linear output as a function of magnet angle.

FIG. 11 shows an experimentally determined plot 53 of magnet height at various magnet angles, according to the invention, giving rise to a linear or nearly linear output as a function of magnet angle. If it is desired to have a linear relationship between magnet angle and voltage, then it is advantageous to use a shaped top magnet with the top heights chosen according to FIG. 11.

One way to describe the plot 53, and to describe the shaped-top magnet defined by the plot 53, is to say that the magnet has a face proximal to a magnetic field sensor, the face of the magnet shaped to provide a varying gap between the face of the magnet and the magnetic field sensor as a function of an angle of rotation of the magnet on its axis, the shape of the face selected to provide a first gap at a first angular position, a second gap larger than the first gap at a second angular position, and a third gap smaller than the second gap at a third angular position. The difference between the first and third angular positions may be greater than 200 degrees, and preferably may be greater than 250 degrees, and indeed may be greater than 280 degrees.

Those skilled in the art will appreciate that different materials will produce different flux outputs as a function of the size of the air gap, and that different physical shapes may be needed depending on the choice of material. An exemplary material for the shaped top magnet is ferrite molded with a polymer binder material to the desired shape, and then magnetized.

Figure 13:
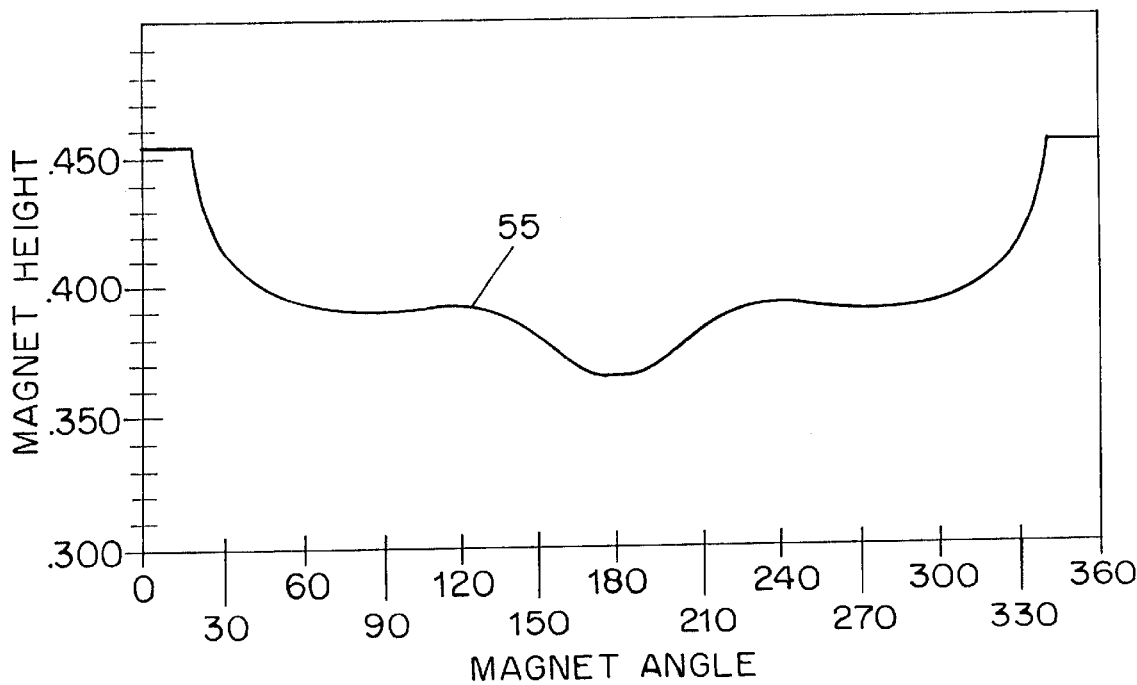
FIG. 13 shows an experimentally determined plot of magnet height at various magnet angles, according to the invention, giving rise to an intentionally nonlinear output as a function of magnet angle.
Figure 12:
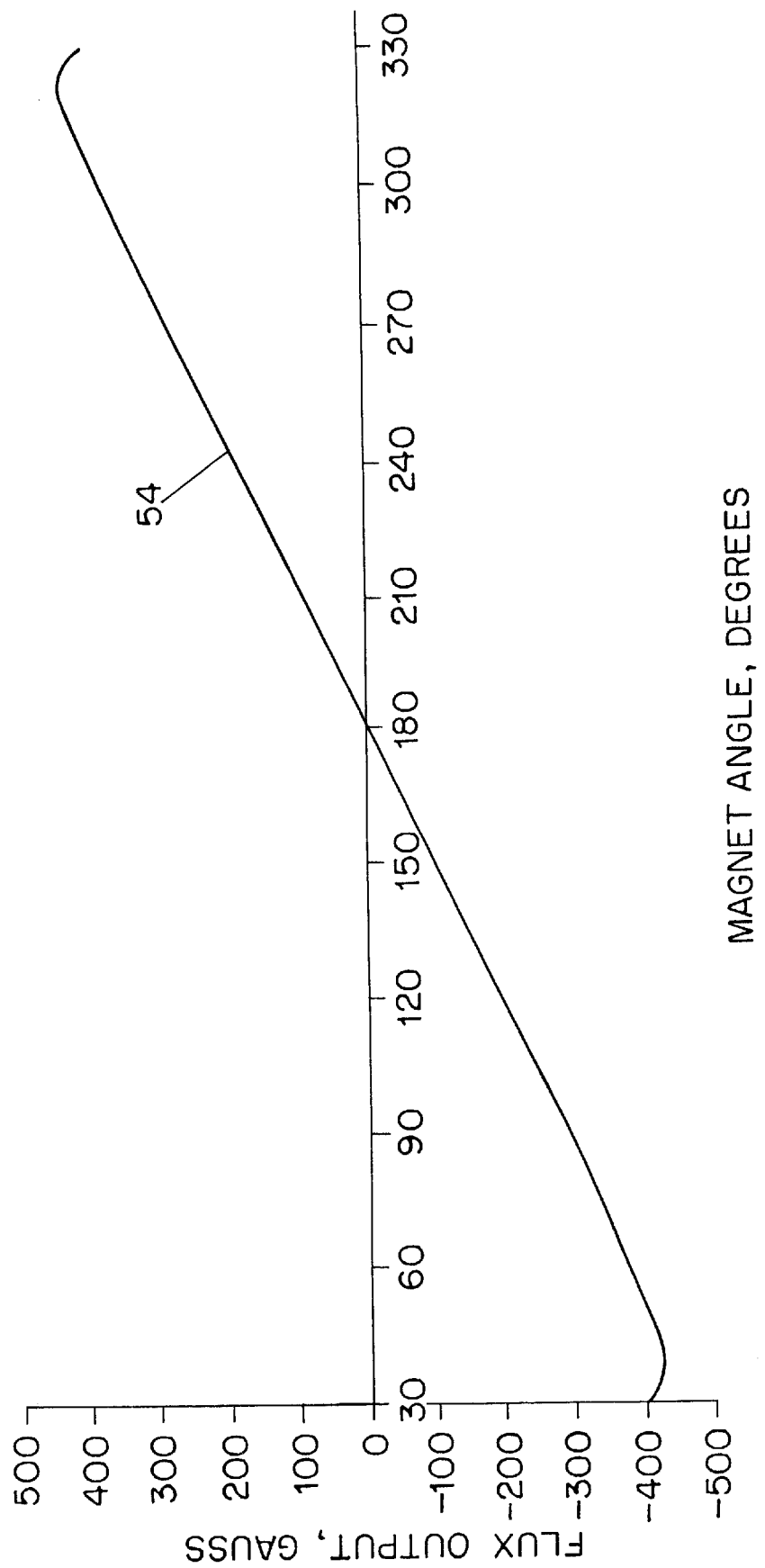
FIG. 12 shows an experimentally measured plot of magnetic field strength (e.g. gauss) as a function of magnet angle, according to the invention, using the magnet heights of FIG. 11.
Figure 14:
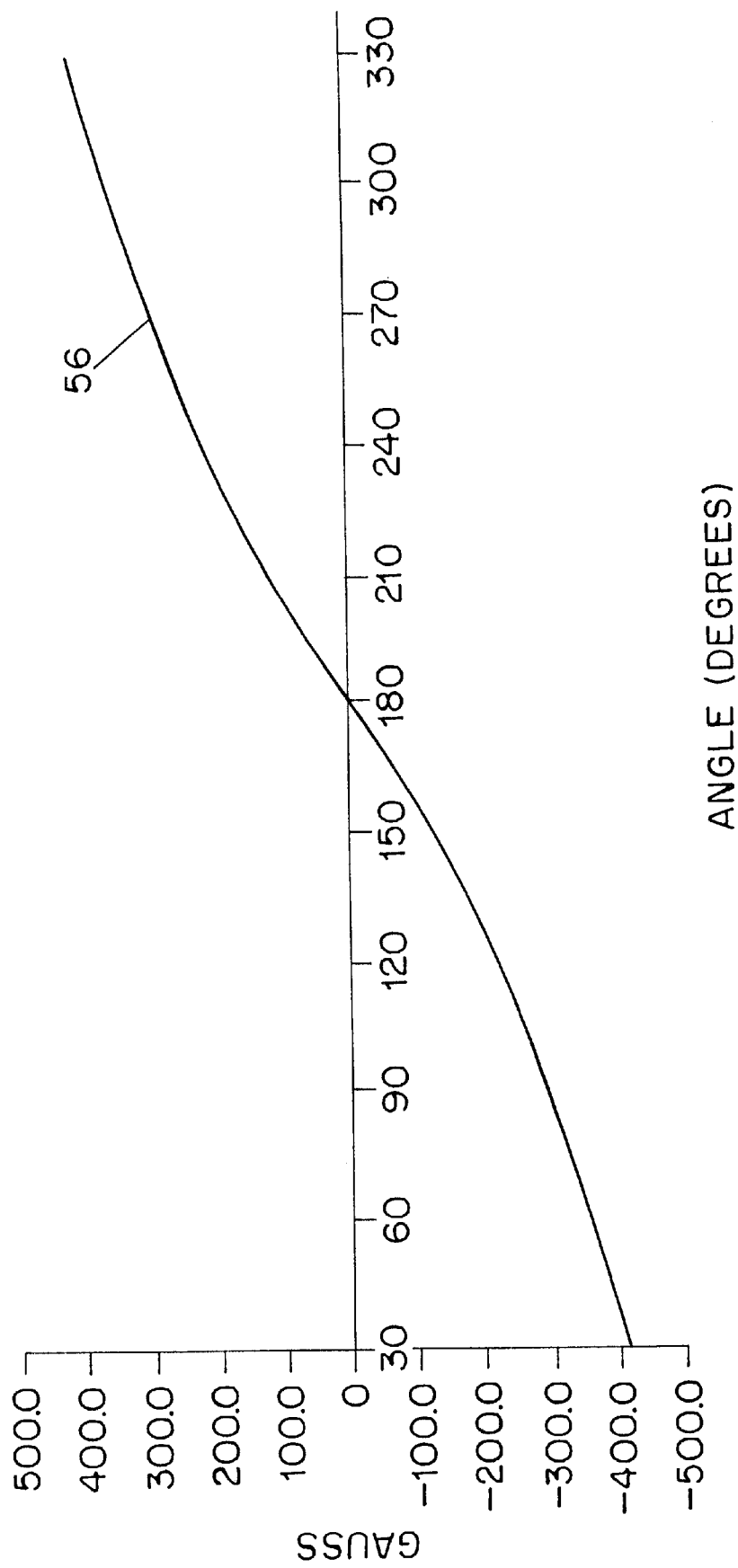
FIG. 14 shows an experimentally measured plot of magnetic field strength (e.g. gauss) as a function of magnet angle, according to the invention, using the magnet heights of FIG. 14.

FIG. 12 shows an experimentally measured plot of magnetic field strength (e.g. gauss) as a function of magnet angle, according to the invention, using the magnet heights of FIG. 11. The curve 54 shows good linearity from less than 50 degrees to more than 310 degrees. This is consistent with the linear plot 43 in FIG. 8, differing in that FIG. 8 shows voltage as a function of angle, whereas FIG. 12 shows magnetic field strength as a function of angle. FIG. 8 also assumes an offset so that all voltages are positive, whereas the field strengths of FIG. 12 range from positive to negative.

mentioned above, the system goal is usually not linearity between magnet angle and voltage, but linearity between liquid level and voltage. As such, the relationship between magnet angle and voltage should be intentionally nonlinear in a way that corrects for nonlinearity between liquid level and magnet angle. Turning now to FIG. 14, it might develop that the desired nonlinearity is that shown in curve 54 of FIG. 14. FIG. 13, then, shows an experimentally determined plot 55 of magnet height at various magnet angles, according to the invention, giving rise to an intentionally nonlinear output as a function of magnet angle as shown in FIG. 14.

Figure 15:
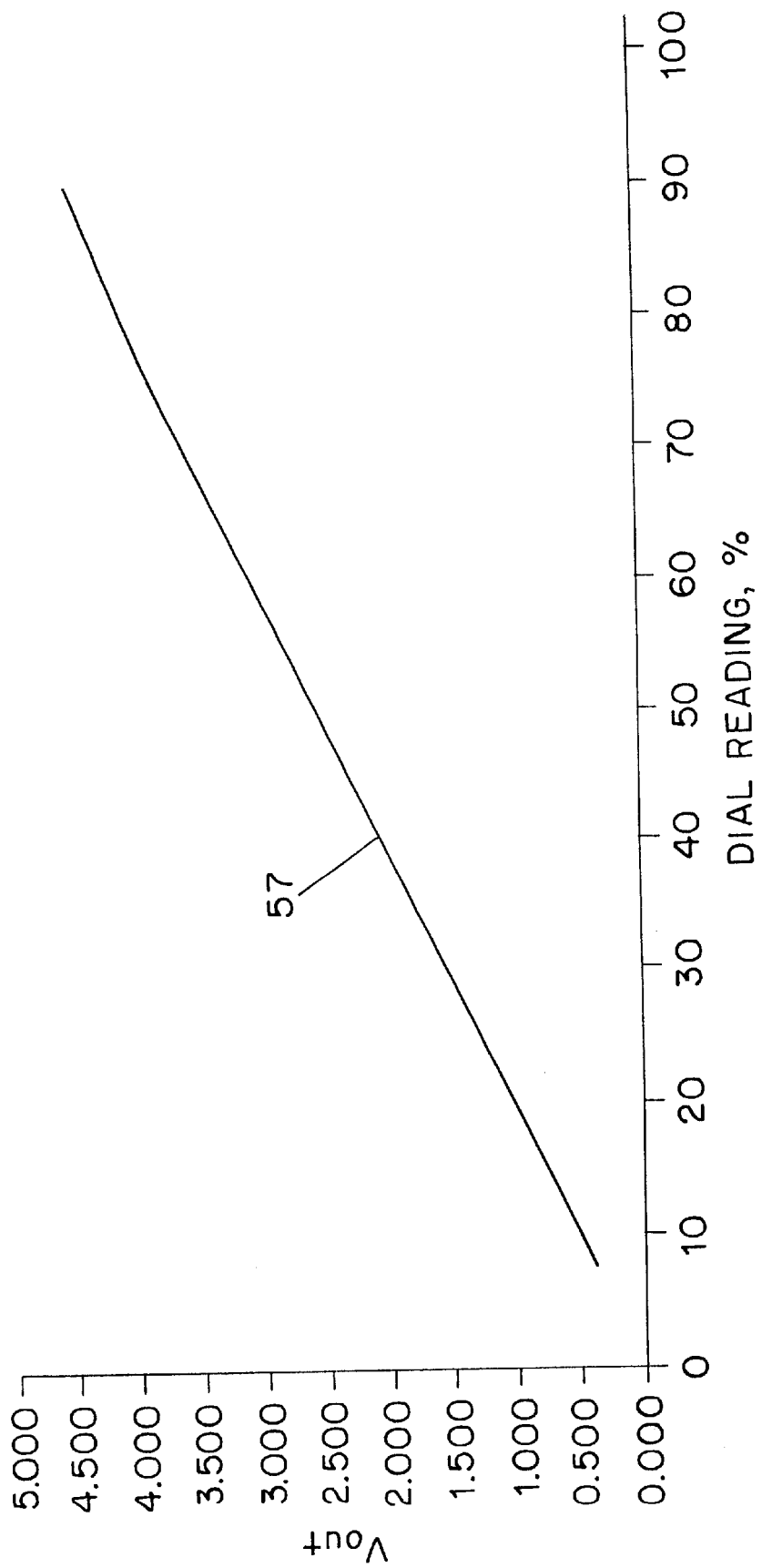
FIG. 15 shows an experimentally measured plot of Hall-effect output voltage as a function of dial reading, according to the invention, which is expected to correlate linearly with liquid level.

As discussed, the nonlinearity of the float and linkage is preferably compensated by a correcting nonlinearity in the relationship between magnet angle and voltage. FIG. 15 shows an experimentally measured plot 57 of Hall-effect output voltage as a function of dial reading, according to the invention. As may be appreciated, the relationship is nearly linear across almost all of the range from 10% to 90%. With appropriate choices of float and linkage, the measurement range could extend from 0% to 100%. With many real-life applications, however, such as knowing when to refill a tank, it suffices to measure values between 10% and 90%.

Those skilled in the art are familiar with standard, prior-art Hall-effect sensors which have integral temperature compensation circuitry. In particular, the above-mentioned three-terminal Hall-effect sensors are available as standard parts with temperature compensation circuitry. Some such parts are programmable by the user to define particular temperature compensation behavior. The obvious use of the programmability of the temperature compensation circuitry is to achieve a nearly constant output of the sensor, as a function of sensed magnetic flux or sensed physical position, despite changes in temperature.

As mentioned above, the equilibrium between liquid and gas phases in a liquified propane or liquified natural gas storage tank is a function of several factors including temperature. For safety, it is desired never to fill the tank fully with liquid, but always to leave a portion of the tank for the gas phase. One safety goal is to avoid an excessive level of gas pressure in the tank. The portion of the tank to be left for the gas phase for safety reasons is, itself, a function of temperature. Those skilled in the art will thus appreciate that the question "is the tank full?" is not exactly the same as "what is the liquid level in the tank?" When the temperature is low, the vapor pressure decreases, and the equilibrium in the tank tends to shift toward the liquid phase. It is desirable not to fill the tank as fully if the temperature is low, because later if the temperature increases the vapor pressure would increase and the equilibrium would shift somewhat toward the gas phase.

In accordance with the invention, it is thus possible to program the temperature compensation circuitry of the Hall-effect sensor so as to take into account (at least partially) the effect of temperature on the stored liquified gas. In a typical application of this aspect of the invention, the temperature compensation circuitry of the Hall-effect sensor is programmed so that the electrical signal indicative of a "full" tank is generated by any of several levels of sensed magnetic flux, depending on temperature. If it is cold, the amount of sensed flux needed to generate a "full" electrical output is less then if it is warm, for example. The programming of the temperature compensation circuitry, together with appropriate selection of magnet shape and other system geometries, can thus achieve an approximation of the full or empty status of the storage enclosure that is more useful than merely detecting a liquid level.

This desirable result which takes temperature into account may also be accomplished by providing a temperature sensor separate from the magnetic field sensor but housed nearby to it, with appropriate circuitry to take temperature into account before the signal for lines 23 is generated.

Stated differently, the sensing system may include a temperature sensor, the sensing system further characterized as being used with a liquid having a vapor pressure and a container having a geometry and volume, the magnetic field sensor emitting a signal indicative of sensed magnetic field strength, the system further comprising compensation means compensating the signal with respect to the sensed temperature and the liquid having a vapor pressure and with respect to the container having a geometry and volume to yield the electrical output, whereby the electrical output is indicative of the fullness of the container.

Figure 17:
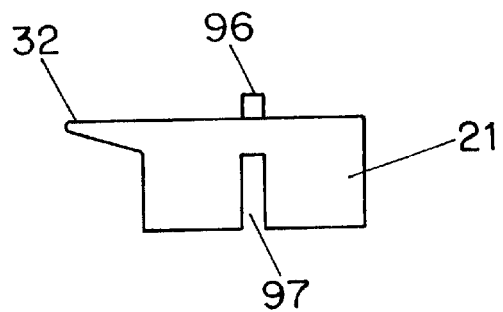
FIG. 17 shows a cross section of a prior art magnet.
Figure 18:
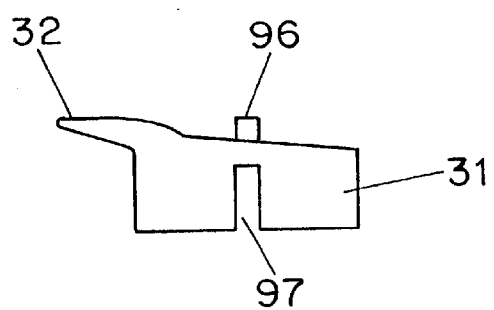
FIG. 18 shows a cross section of a shaped-top magnet.

17 shows a side cross section of a magnet 21 according to the prior art. An axial hole 97, centered in the bottom face of the magnet 21, is formed so that the magnet can rotate upon a stationary spindle, omitted for clarity in FIG. 17. A feature 96 formed onto the top of the magnet 21 preferably defines a mechanical tolerance for axial movement of the magnet 21 within its housing. In the system according to the invention, as described above, the magnet 31 has a shaped top, and part of the shaping of the top may be perceived in FIG. 18 in the slope that is downward to the right at the top of the magnet 31.

Figure 19:
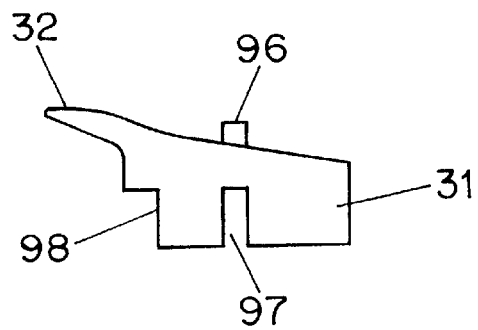
FIG. 19 shows a cross section of a balanced shaped-top magnet.

A full consideration of the forces acting upon the magnet 21 or 31 would take into account not only the magnetical dipole of magnet 88, but also gravity. If the axis of rotation of magnet 21 or 31 is vertical, then gravity will not tend to cause rotation of the magnet 21, 31. In some applications, however, the gauging system may be positioned so that the axis of rotation is non-vertical. In such applications, it may be appreciated that the magnet 31 may have a center of mass that is not on-axis. The center of mass is shifted by the mass of the pointer 32 and by the shaping of the top of the magnet 31. In FIG. 19, for example, the center of mass is to the left of the center hole 97. Thus, according to the invention, it is desirable to provide a relief area 98. With appropriate selection of the relief area 98, the center of mass can be shifted back toward the axis defined by center hole 97. In this way, the angle of the magnet 31 is substantially unaffected by gravity and thus provides more accurate readings. Stated differently, the magnet 31 will track the magnet 88 more faithfully because it is gravitationally balanced.

Figure 20:
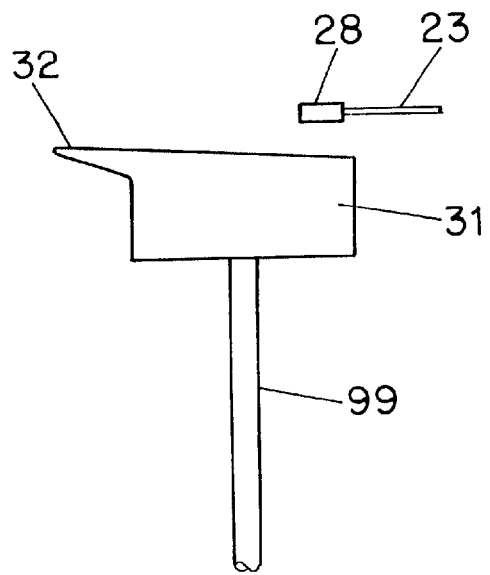
FIG. 20 shows a shaped-top magnet positioned by means of a shaft.

While the inventive benefits of the shaped-top magnet have been described in detail above in a system where the magnet 31 rotates due to magnetic coupling to another magnet 88, it should be appreciated that these same benefits may be enjoyed in systems employing other couplings. As shown in FIG. 20, a shaped-top magnet 31 may be caused to rotate because of a direct mechanical connection with an axle 99. Rotation of the axle 99 causes a rotation of shaped-top magnet 31, the angle of which is sensed by means of sensor 28 with electrical leads 23. The pointer 32 may or may not be needed, depending on whether there is a need for a user to be able to observe the position, for example on a scale.

another possibility is that the physical phenomenon being sensed is not communicated with a shaft or axle 99 but is instead communicated by linkage with a crank arm or some other mechanical linkage.

Figure 21:
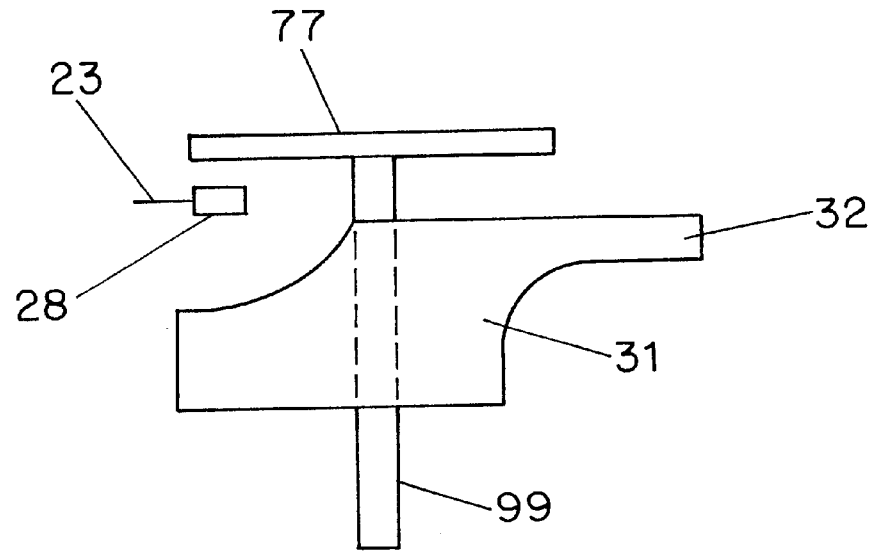
FIG. 21 shows a shaped-top magnet in combination with a flux path element nearly completing a flux loop.

Turning now to FIG. 21, what is shown is a shaped-top magnet in combination with a flux path element nearly completing a flux loop. Magnet 31 has optional pointer 32 as described above. Magnet 31 is caused to rotate, either by magnetic linkage to a second magnet such as described above, or by mechanical linkage such as to shaft 99. A washer 77 may be fixed to the magnet 31 and thus rotates with the magnet 31. Magnetic sensor 28 is positioned between the washer 77 and the magnet 31.

Figure 22:
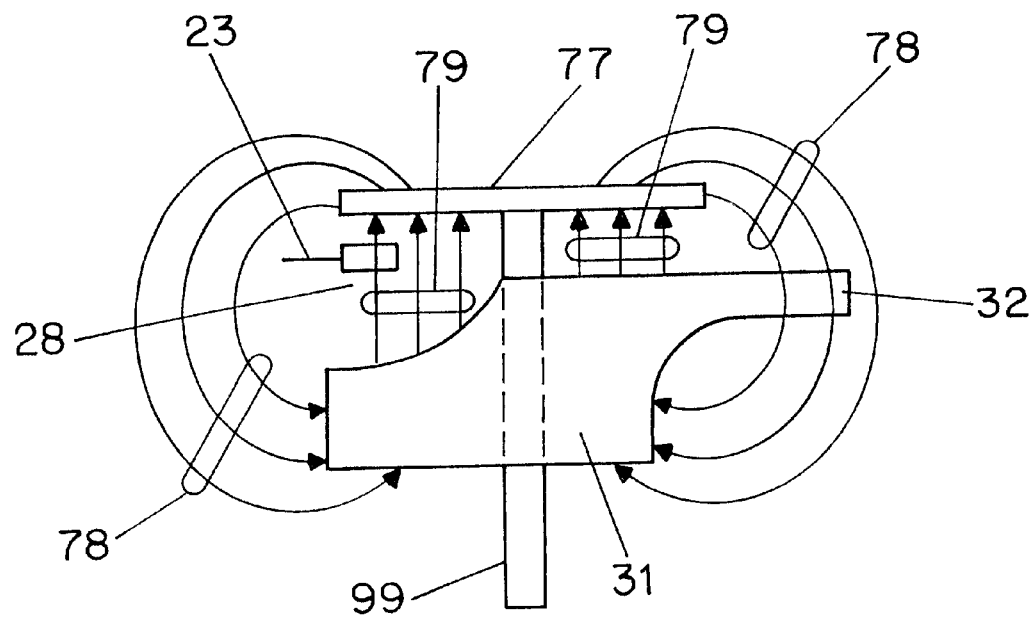
FIG. 22 shows the combination of FIG. 21 together with representative lines of magnetic flux.

FIG. 22 shows the combination of FIG. 21 together with representative lines of magnetic flux 78, 79. Importantly, the lines of flux 79 are fairly close to being parallel, which is a rather different situation than would obtain in the absence of washer 77. In the absence of washer 77, the lines of flux 79 would likely diverge like the lines 78. Such divergence leads to loss of accuracy if the magnet 31 moves axially, as might happen in some situations, for example with wear in axial bearings on the shaft 99. The presence of the washer 77, made of a material selected for its ability to provide an easy flux path, leads to the fairly parallel lines 79. Lines 79 may indeed develop to be not only parallel but axial, all of which contributes to the result that readings at the sensor 28 are fairly consistent even with axial movement of the magnet 31.

It should be appreciated that the arrangement with the washer 77 fixed to the magnet 31 is thought to be preferable, but some of the benefits of the invention would also be available if the washer were fixed to a housing and did not rotate with the magnet 31.

Figure 23:
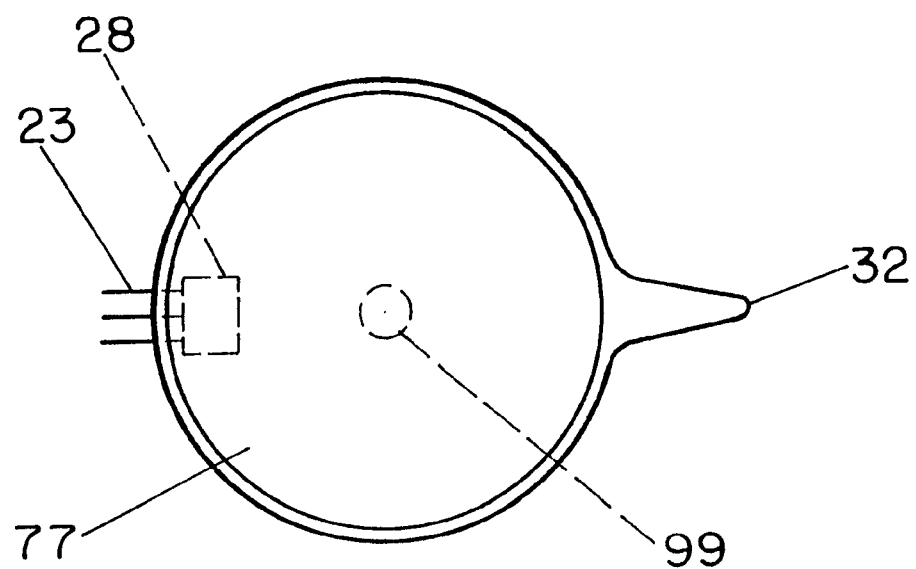
FIG. 23 shows a top view of the combination of FIG. 21.
Figure 24:
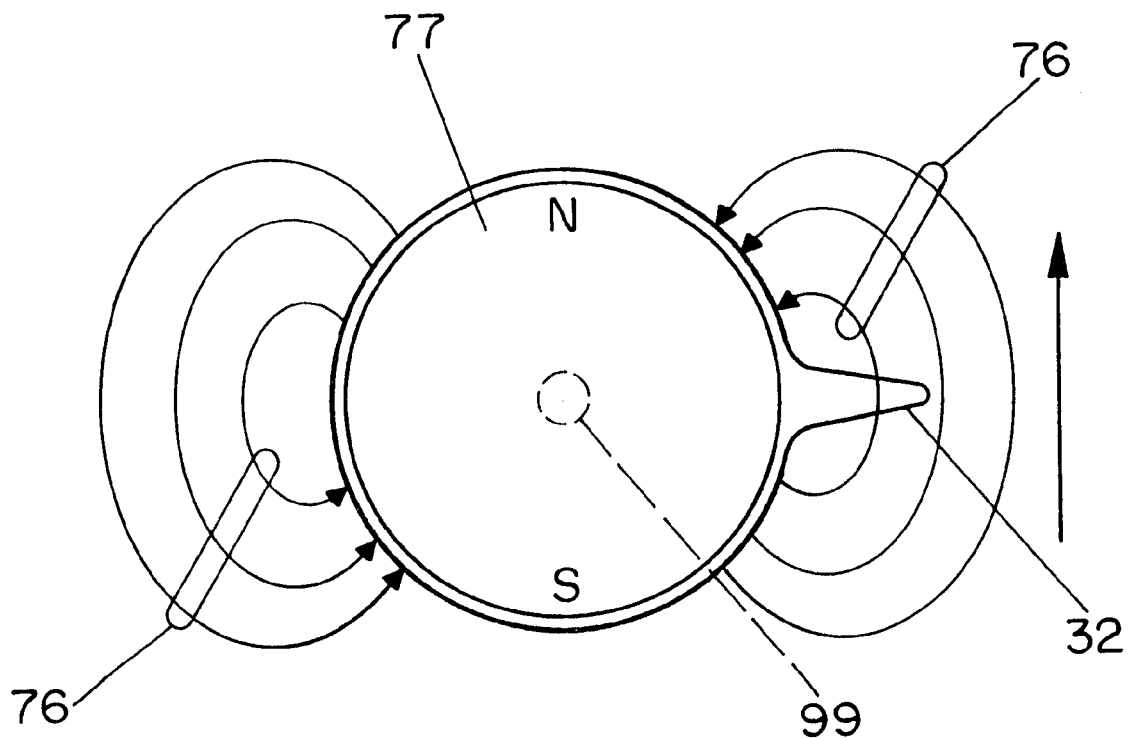
FIG. 24 shows the combination of FIG. 23 together with representative lines of magnetic flux.

FIG. 23 shows a top view of the combination of FIG. 21. The optional pointer 32 may be seen, as well as the washer 77. Shaft 99 and sensor 28 are shown in phantom. FIG. 24 shows the combination of FIG. 23 together with representative lines of magnetic flux 76. As may be seen, a typical configuration has north and south poles as shown in FIG. 24.

pointer 32 may be formed with the magnet 31, but may also be formed with the washer 77 or may be some nonmagnetic material attached to the washer 77. Alternatively, washer 77 may bear a scale which is read relative to a fixed pointer attached to a housing, not shown in FIG. 24.

The flux path element is shown as a washer 77, but it should be appreciated that its benefits are available even if the washer is not fully circular. For example, the flux path element could be a semicircular disk positioned so that it covers the range of movement about the sensor. It can be of iron or magnetic steel or could be integrally formed with the magnet 31 and from the same material as the magnet 31.

It should also be appreciated that the system of two linked magnets offers its benefits even if the physical quantity being sensed is not a liquid level measured with a float. The separation between the two magnets can separate any two environments, one of which might be an environment of a hazardous or flammable gas, or might be under very different air pressure, for example.

It should likewise be appreciated that the linearization approach described here offers its benefits even if there is no need to extend range past 180 degrees.

Those skilled in the art will have no difficulty identifying and devising myriad obvious variations of the invention without departing in any way from the invention, as defined by the claims which follow.

What is claimed is:

1. A sensing system for use with a boundary and protruding through an opening in the boundary, the sensing system comprising:

a first magnet, said first magnet axially rotatable on a first axis, said first magnet having a magnetic moment with a nonzero component at a right angle to the axis;

a linkage between a sensed phenomenon and the first magnet causing the first magnet to rotate in response to the sensed phenomenon;

a second magnet having a magnetization, said second magnet axially rotatable on a second axis, said magnetization of the second magnet giving rise to a nonzero component at a right angle to the second axis, the first and second magnets juxtaposed in magnetic linkage so that the second magnet is urged to follow the first magnet in rotation;

a divider separating the first and second magnets, the divider plugging the opening in the boundary;

a magnetic field sensor positioned to sense axial magnetic field strength at a location offset from the second axis;

the second magnet having a face proximal to the magnetic field sensor, the second magnet giving rise to a sensed magnetic field at the magnetic field sensor, the axial face of the second magnet shaped to provide a varying gap between the face of the second magnet and the magnetic field sensor as a function of an angle of rotation of the second magnet on the second axis, the shape of the face selected to provide a first gap at a first angular position, a second gap larger than the first gap at a second angular position, and a third gap smaller than the second gap at a third angular position, the difference between the first and third angular positions being greater than 200 degrees, the second angular position being between the first and third angular positions.

2. The sensing system of claim 1 wherein the magnetic field sensor is a Hall-effect sensor.

3. The sensing system of claim 1 wherein the difference is greater than 250 degrees.

4. The sensing system of claim 3 wherein the difference is greater than 280 degrees.

5. The sensing system of claim 1 wherein the second magnet is further characterized in that its center of mass is substantially on the second axis.

6. The sensing system of claim 1 wherein the second magnet further comprises a pointer, the pointer visible to a user.

7. The sensing system of claim 6 wherein the second magnet is further characterized in that its center of mass is substantially on the second axis.

8. A sensing system for use with a boundary and protruding through an opening in the boundary, the sensing system comprising:

a first magnet, said first magnet axially rotatable on a first axis, said first magnet having a magnetic moment with a nonzero component at a right angle to the axis;

a linkage between a sensed phenomenon and the first magnet causing the first magnet to rotate in response to the sensed phenomenon; second magnet having a magnetization, said second magnet axially rotatable on a second axis, said magnetization of the second magnet giving rise to a nonzero component at a right angle to the second axis, the first and second magnets juxtaposed in magnetic linkage so that the second magnet is urged to follow the first magnet in rotation;

a divider separating the first and second magnets, the divider plugging the opening in the boundary;

a magnetic field sensor positioned to sense axial magnetic field strength at a location offset from the second axis;

the magnetization of the second magnet giving rise to north and south poles separated by more than 200 degrees of axial rotation of the second magnet on the second axis.

9. The sensing system of claim 8 wherein the magnetic field sensor is a Hall-effect sensor.

10. The sensing system of claim 8 wherein the separation of the north and south poles of the second magnet exceeds 250 degrees.

11. The sensing system of claim 8 wherein the separation of the north and south poles of the second magnet exceeds 280 degrees.

12. The sensing system of claim 8 further comprising a flux path element positioned relative to the second magnet with the magnetic field sensor between the second magnet and the flux path element.

* * * * *